United States Patent [19]
Irelan, Jr.

[11] 3,963,036
[45] June 15, 1976

[54] SHUT-OFF VALVE EXCAVATOR

[76] Inventor: Carl Irelan, Jr., 117 E. 36th St., Boise, Idaho 83704

[22] Filed: Mar. 7, 1975

[21] Appl. No.: 556,242

[52] U.S. Cl. .............................. 134/102; 134/104; 134/177; 134/183; 134/198; 15/304
[51] Int. Cl.² ............................................. B08B 3/02
[58] Field of Search 134/94, 102, 104, 166 R–168 R, 134/166 C–168 C, 175, 177, 183, 198, 200–201; 15/304, 395, 406

[56] References Cited
UNITED STATES PATENTS

| | | | |
|---|---|---|---|
| 666,799 | 1/1901 | Buckwalter et al. | 15/406 UX |
| 751,253 | 2/1904 | Brady | 15/406 X |
| 1,654,727 | 1/1928 | Green et al. | 134/198 X |
| 2,612,998 | 10/1952 | Smith | 134/167 R |
| 3,677,272 | 7/1972 | Schrank et al. | 134/166 C X |
| 3,849,830 | 11/1974 | Wagner | 15/304 X |

FOREIGN PATENTS OR APPLICATIONS

| | | | |
|---|---|---|---|
| 1,458,632 | 3/1971 | Germany | 134/167 C |

Primary Examiner—Robert L. Bleutge
Attorney, Agent, or Firm—Jones, Tullar & Cooper

[57] ABSTRACT

Apparatus for cleaning out and flushing away debris such as soil, rocks and the like from around a shut-off valve on a gas or water main located at the bottom of a concrete pipe or sleeve is disclosed. The apparatus is comprised of a first elongated section of pipe having means for connecting sources of water and compressed air thereto, and a second parallel section of pipe generally of the same length. The two sections of pipe are inserted into the concrete pipe or sleeve and water and compressed air travel down the first pipe and loosen the debris from around the valve stem, flushing it up the second pipe. A slideable cover is carried by the two pipes and serves to seal the upper end of the sleeve or cylinder thereby insuring that all the debris and flushing fluid is forced to exit through the second pipe.

1 Claim, 3 Drawing Figures

SHUT-OFF VALVE EXCAVATOR

FIELD OF THE INVENTION

The present invention is directed generally to a pipe clean out device. More specifically, the present invention is directed to a clean out tool for use in removing accumulated debris from around a water or gas line shut-off valve. Most particularly, the present invention is directed to such a clean out tool for use on valves which are located at the lower end of a concrete or metal pipe or sleeve with the valve itself located below the surface of the ground.

Two generally L-shaped pieces of pipes are affixed together with their long portions parallel to each other and their short segments extending generally away from each other. A first one of these pipes carries, on its shorter segment, conventional connectors and valves so that sources of water or a similar fluid and compressed air can be attached and their flow rates controlled. The apparatus is lowered into the concrete or metal pipe or sleeve which rises to the earth's surface from the water or gas main's shut-off valve. A slideable cover or collar is carried by the two pipes and seals the opening of the sleeve or pipe. Water and compressed air are carried down the first or inflow pipe to loosen any debris around the valve's stem. Any such debris is forced up the second or outflow pipe thereby clearing the valve's stem and allowing the valve to be opened or closed by conventional tools.

DESCRIPTION OF THE PRIOR ART

Virtually every area of the country is served by municipal water and/or gas carried through underground pipelines or mains. A distribution line leaves a central point of supply and branches out into an ever enlarging network until all buildings are connected. For safety reasons and for ease in isolating a particular segment of the network in case of needed repairs or replacement, numerous valves are provided in the lines. Since these lines are almost universally located at least several feet below the ground and often much deeper in colder areas, access to the various valves is provided by placing upwardly extending concrete or metal pipes or sleeves around the valve with the pipe or sleeve extending upwardly to the surface of the ground where a cup or lid is provided.

When it is necessary to shut off or open the valve, the cap is removed from the top of the sleeve and a tool, usually a socket wrench on the end of an elongated rod, is inserted into the sleeve to actuate the valve. If the pipe or sleeve is free from debris, the valve can be opened or shut. However, if for some reason the sleeve or pipe is not clear, it may be impossible to seat the tool on the valve stem.

Although the cap covering the upper end of the pipe or sleeve is intended to remain in place, this often is not the case. These sleeves and hence their caps are often located in roadways or on sidewalks. When the cap is located in the roadway, vehicle tires often strike the cap and can flip it out of place. When the cap is placed in a sidewalk, pedestrian traffic may move the cap out of position. Additionally, vandals or mischievous children often removes the caps and may deliberately throw dirt and stones down the sleeve. The natural action of rain and flowing water also adds to the accumulation of dirt and other debris which is deposited around the valve and stem making access thereto difficult and often impossible.

When it becomes necessary to shut off one of these valves which has had its stem obstructed by dirt and other debris, expensive and time consuming procedures must often be resorted to. Since the valve may be located up to 4 or 6 feet below the surface, it is impossible to reach in and clean out the valve by hand. Additionally, the concrete or metal pipe or sleeve is generally only 6 inches in diameter so that long handled shovels and the like cannot be used. Frequently, the only way of gaining access to such a valve surrounded by debris is to bring in a crew of men and a backhoe or similar machine, break up the blacktop or asphalt, excavate to the depth of the valve, remove the pipe or sleeve, and then close or open the valve. The pipe or sleeve must then be replaced, the excavation filled in, and the street resurfaced. This involved procedure may easily take 3–4 hours and requires a crew of men. Such a process is obviously expensive and in the situation where, for example, a water or gas line has been ruptured, the delay associated with the process can cause substantial water damage to property or risk of explosion.

Although the prior art provides numerous devices for unclogging sewer lines and the like, these devices are not useable in the present situation where the debris cannot be forced ahead along the pipe but instead must be carried up and out of the sleeve. Prior methods resorted to for removing debris from around these valves have, as discussed above, been expensive, slow, and generally not satisfactory.

SUMMARY OF THE INVENTION

It is, accordingly, an object of this invention to provide an apparatus for removing debris from around water and gas line shut-off valves which overcomes the disadvantages of prior methods.

Another object of the invention is to provide an apparatus for removing debris from around shut-off valves which is simple and quick in operation.

A further object of the invention is to provide a shut-off valve excavator which is light, portable and easily put into use.

Still another object of the invention is to provide an apparatus for removing debris from around shut-off valves which is durable so as to withstand rough handling and which is inexpensive.

As will be set forth in greater detail in the description of a preferred embodiment which follows, the apparatus of the present invention is comprised of two generally L-shaped pipes or tubes. The two pipes are joined to each other with their long sections parallel and their short sections extending away from each other. A first or inflow pipe carries, on its short section, suitable connectors and valves for the supply and control of water and compressed air to the pipe. A slideable collar is carried on the long sections of the pipes and has a diameter generally the same as that of the concrete or metal sleeve which surrounds the valve and extends up to the surface. In use, the cap is removed from the upper end of the valve-surrounding sleeve and the long segments of pipe of the clean out device inserted down the sleeve. Water and compressed air lines are connected to the short segment of the inflow pipe and the valves opened to allow flow down the pipe. The collar is slid down the pipes until it engages the upper end of the sleeve and is retained in place by, for example, the operator standing thereupon. The water and compressed air loosens the dirt and other debris from around the valve stem portion of the valve and carries it upwardly through the second or outflow pipe to be disposed of. The apparatus may be rotated around the sleeve to insure complete cleanout of the sleeve.

The apparatus of the present invention allows for the rapid, efficient clearage of debris from around a shut-off valve in a minimum of time. No excavation is required and the clean out can be completed in 10 minutes or less as opposed to the 3–4 hours required by the prior methods. One or two men can easily accomplish such a clean out instead of the 5 or 6 man crew required to accomplish the excavation previously required. While the present apparatus may not be capable of removing large stones placed in the sleeve, it does an effective job on removing the normal accumulation of dirt and other debris which usually finds its way into such a sleeve. The device is durable and capable of withstanding rough useage, is quickly made ready for use by attaching water and air lines and is inexpensive to manufacture and requires virtually no maintenance. It provides a quick, efficient means for clearing away debris from around a valve so that the valve may be opened or closed by the use of conventional tools.

DESCRIPTION OF THE DRAWINGS

While the novel features of the invention are set forth with particularity in the appended claims, a full and complete understanding of the apparatus and its use may be had by referring to the following description of a preferred embodiment and as shown in the included drawings in which:

DESCRIPTION OF A PREFERRED EMBODIMENT

Figure 1:
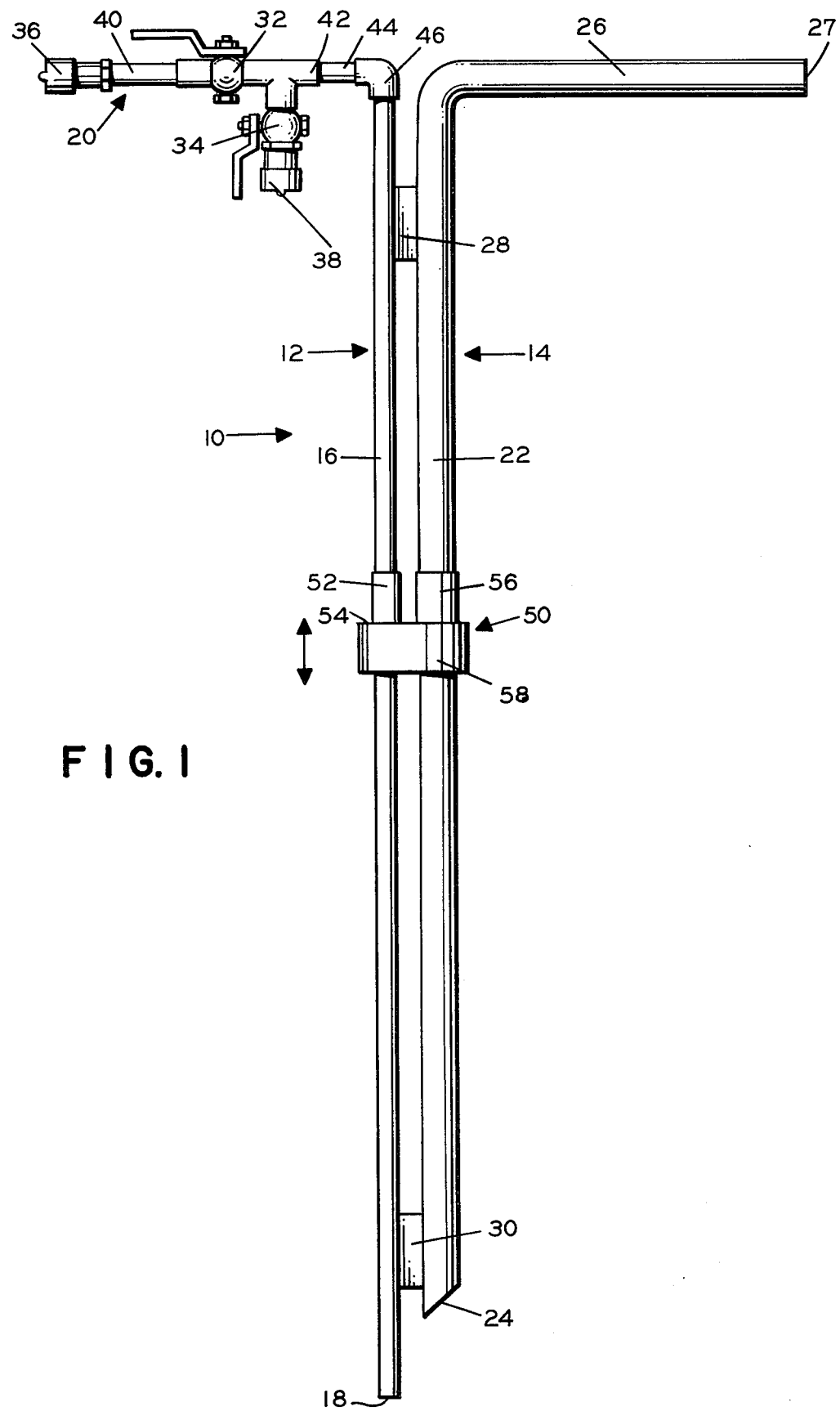
FIG. 1 is a side elevation view of a preferred embodiment of the apparatus of the present invention.

A preferred embodiment of the shut-off valve excavator apparatus of the present invention is shown generally at 10 in FIG. 1. The apparatus is comprised generally of first and second L-shaped pipes or conduits 12 and 14, respectively. The first L-shaped section of pipe or conduit 12 is the inflow pipe and has a long segment 16, terminating at a lower open end 18, and an upper, short segment 20. The second L-shaped section of pipe or conduit 14 is the outflow pipe and also has a long segment 22, terminating at a lower open end 24, and an upper short segment 26.

As may be seen in FIG. 1, long segments 16 and 22 of first and second pipes 12 and 14, respectively are disposed generally parallel to each other and are secured in place by a pair of spacer blocks, 28 and 30, placed generally at the upper and lower ends of the segments. The pipe sections 16 and 22 are secured to the spacer blocks 28 and 30 by any suitable means such as welding, brazing or by nuts and bolts. In the preferred embodiment, long section 16 of inflow pipe 12 is ¾ inch diameter galvenized pipe and is 6 feet, 5 inches long. Long section 22 of outflow pipe 14 is 2 inch O. D. steel pipe and, as may be seen in FIG. 1, the lower end 24 of second pipe 4 is slanted at generally a 45° angle and terminates slightly above the lower end 18 of the first pipe 12.

Upper portion 20 of first pipe 12 is generally perpendicular to lower section 16 of inflow pipe 12 and extends generally horizontally to the ground when apparatus 10 is in use. Upper portion 26 of the outflow pipe 4 has an open end 27 and is also generally perpendicular to lower section 22 of the second pipe 14. Portion 26 of pipe 14 is disposed generally in the same plane as portion 20 of the first pipe with its open end 27 facing away from portion 20 of the first pipe.

Upper portion 20 of the first pipe 12 includes, as may be seen in FIG. 1, a pair of valves 32 and 34 and a pair of hose connectors 36 and 38. Hose connector 36 is joined to the inlet of valve 32 by a section of galvenized pipe 40 which, in the preferred embodiment is ¾ inch diameter and is 5 inches long. Hose connector 38 is joined directly to valve 34 and valve 34 is joined by a "T" fitting 42 to the outlet end of valve 32. A 2 inch section of ¾ inch galvanized pipe 44 connects the third end of the T fitting 42 to a ¾ inch, 90° galvenized elbow 46 located at the upper end of the long section 16 of inflow pipe 12. Both valves 32 and 34 are conventional and are preferrably ball valves capable of varying flow therethrough. Hose connectors 36 and 38 are also conventional and serve to allow rapid and easy connection and disconnection of air and water lines. Thus, it may be seen that first pipe 12 is the inlet conduit for the flushing fluid. Compressed air and water lines are attached to connectors 36 and 38 and the flows are controlled by valve 32 and 34. Either air or water may be attached to either connection at the convenience of the operator.

As may also be seen in FIG. 1, a collar 50 is slideably carried by the long sections 16 and 22 of the first and second pipes 12 and 14. A first cylindrical sleeve 52 is attached to a top portion 54 of collar 50 and is slideable over section 16 of pipe 12. A second similar sleeve 56 is also secured to top 54 of collar 50 and is slideable over section 22 of second pipe 14. In the preferred embodiment, collar 50 is 7 inches in diameter, is of steel, and has a downwardly extending sidewall portion 58. Collar 50 is free to slide up or down on sections 16 and 22 of pipes 12 and 14 with its travel being limited by the spacer blocks 28 and 30.

Figure 2:
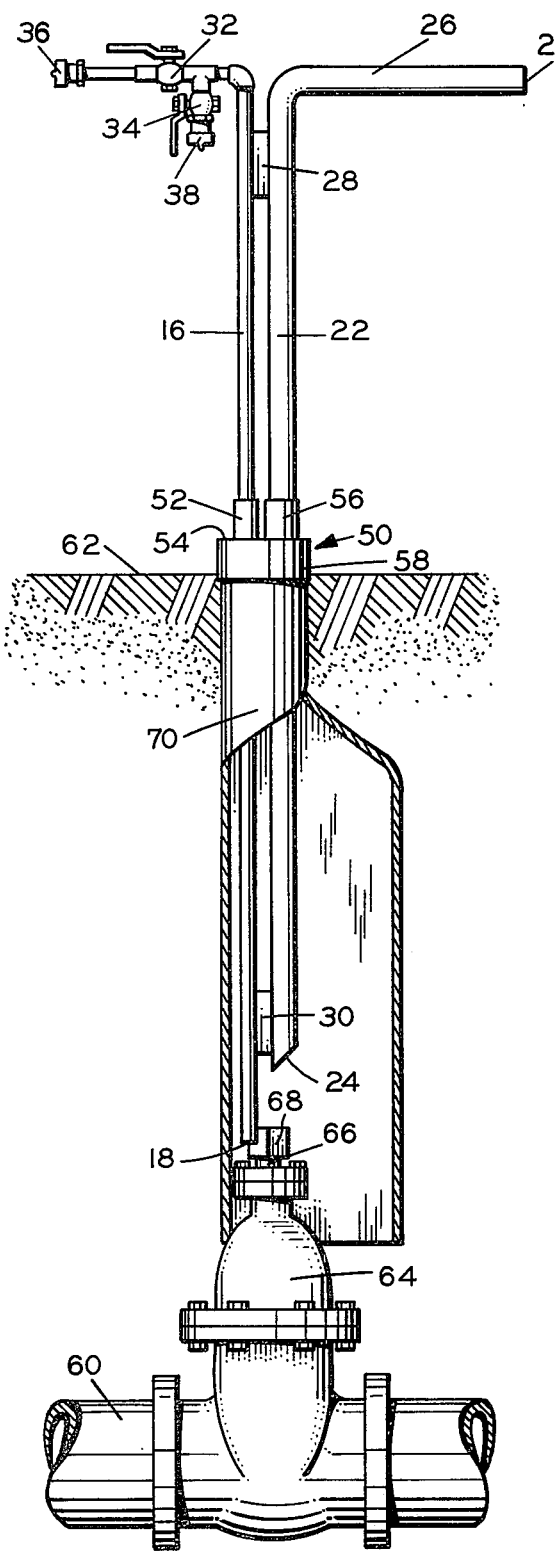
FIG. 2 is a side elevation view, partly in section, of the apparatus in use with a portion of the sleeve surrounding the valve opened to show the valve stem.
Figure 3:
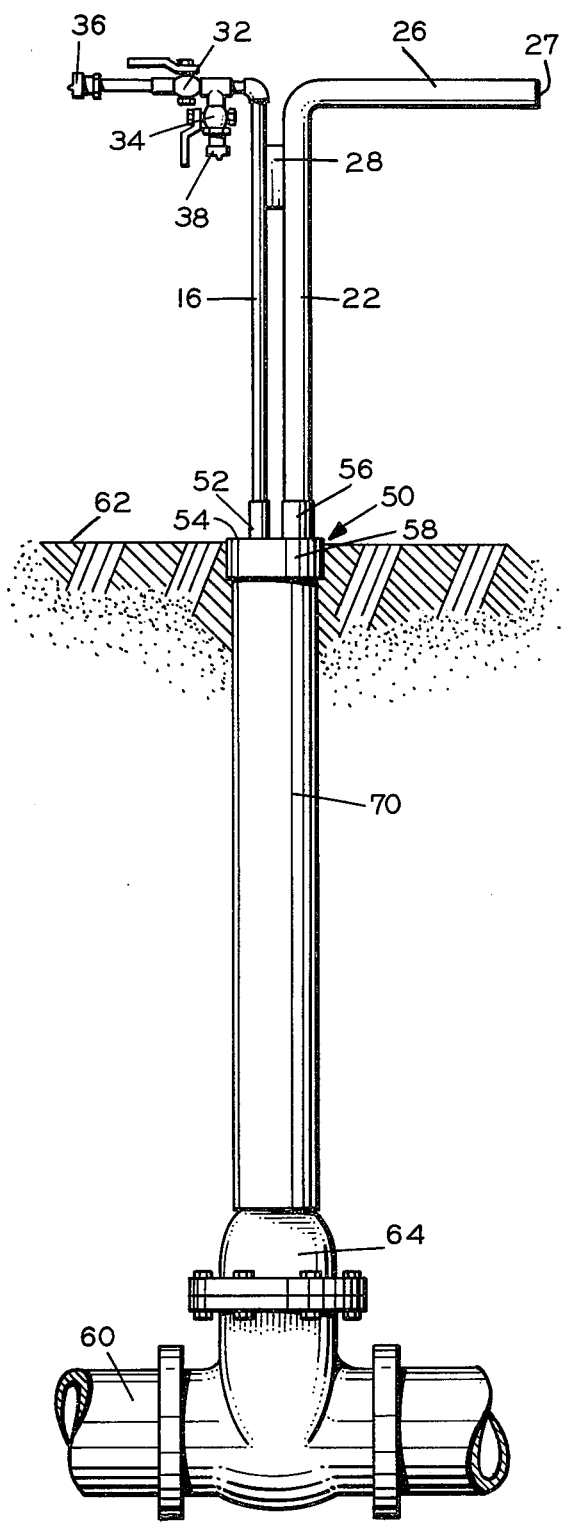
FIG. 3 is a side elevation view similar to FIG. 2 but with the sleeve in place.

Referring now to FIGS. 2 and 3, there is shown a water or gas pipeline 60 buried generally 2 to 8 feet below a surface 62. It is to be understood that surface 62 may be a tarred road, a sidewalk, a lawn, or any other usual surface. A shut-off valve, generally at 64, is provided in line 60 with valve 64 having an upwardly extending stem 66 provided with a nut 68. To open or close the valve, a socket (not shown) is placed on nut 68 and turned. A concrete or metal sleeve 70, of generally 6 inches diameter, extends upwardly from valve body 64 to the surface 62. A cap (not shown) is intended to cover the upper end of sleeve 70 but, as discussed previously, this cap is often not effective and debris enters sleeve 70 and accumulates at the bottom of sleeve 70, covering valve stem 66 and nut 68 thereby preventing the seating of a socket on nut 68 so that opening or closing of the valve is not possible.

In operation, the cap (not shown) is removed from the upper end of pipe or sleeve 70. A visual inspection ascertains that the nut 68 is not accessible and that a clean out is necessary. The long sections 16 and 22 of clean out device 10 are inserted vertically down the sleeve 70 until the lower end 18 of the inflow pipe 12 bottoms on valve 64. The apparatus is then raised slightly to allow the flushing fluid to exit into the sleeve 70. Collar 50 is slid into place around the upper end of sleeve 70, as may be seen in FIG. 3. If desired, collar 50 may be secured in place by suitable bolts (not shown) passing through sleeves 52 and 56 or by other conventional means. Alternatively, the operator may stand on collar 50 to retain it in place. A water line is connected to one of the connectors 36 or 38 and a compressed air line from, for example, a portable air compressor, is attached to the other. Water and compressed air in amounts controllable by the valves 32 and 34 are carried down inflow pipe 16 an exit at 18. This water and compressed air carries the debris up outflow line 22 where it exits at 27. It is to be understood that a hose or other conduit could be attached at 27 to carry the debris away. Since the upper end of sleeve 70 is closed by collar 50, the only exit for the water and debris is out outflow line 22. The lower end 24 of outflow line 22 is disposed above the lower end 18 of inflow line 16 and is angled to allow easier flow of the water and debris up the line 22. When the outflow coming out opening 27 is clear, the water may be shut off and compressed air used to remove any water remaining in sleeve 70. Apparatus 10 may then be removed and valve 64 opened or closed in the conventional manner.

This apparatus could be used to clean out any closed end conduit wherein the flushing liquid and debris cannot be forced along the conduit but must instead return generally to the point of entry. The short horizontal portion of the outflow line serves to carry the flushing liquid and debris away from the worksite. Since the flushing fluid is carried down the inflow line 16 to a point adjacent the valve stem to be cleaned, and because the water and air exit at 18 with some force, the debris is rapidly entrained in the flushing fluid and is carried away up the outflow pipe 22.

Thus it may be seen that the apparatus of the present invention provides a device which is durable, inexpensive, easy to use and which is effective in removing debris from around a water or gas shut-off valve located in a closed circuit. In comparison to prior methods which often required 3 or 4 hours and 5 or 6 man crew to excavate around the cylinder or sleeve in order to reach the valve, the apparatus of the present invention allows for such a clean-out in 5 to 10 minutes and requires only one or two men.

While a preferred embodiment of a shut-off valve excavating or clean out device has been fully and completely described hereinabove, it will be obvious to one of ordinary skill in the art that a number of changes could be made without departing from the spirit of the invention. For example, various other valves and connectors could be provided on the horizontal portion of the inflow line; the diameters of the inflow and outflow lines and of the sliding collar could be varied to accomodate various sized conduits; the lengths of the vertical portions of the inflow and outflow lines could be varied and these pieces could be sectionalized to adapt the device for use with sleeves of differing depths. Accordingly, the invention is to be limited only by the scope of the following claims.

I claim:

1. Apparatus for cleaning out and flushing away debris from around a shut-off valve located in a closed sleeve to facilitate access to the valve, said apparatus comprising:
   an inflow pipe for carrying flushing fluid into the closed sleeve;
   an outflow pipe generally parallel to said inflow pipe and secured to said inflow pipe by a pair of spaced apart spacer blocks, said outflow pipe carrying flushing fluid and entrained debris out of the closed sleeve;
   means for controllably supplying flushing fluid to said inflow pipe; and
   a collar slidably carried on said inflow and outflow pipes between said spacer blocks, said slidable collar being of greater diameter than the sleeve whereby said collar is slidable over an open end of said sleeve to allow outflow of flushing fluid.

* * * * *